(12) United States Patent
Hart et al.

(10) Patent No.: US 6,360,994 B2
(45) Date of Patent: Mar. 26, 2002

(54) CONFIGURABLE SPACE LAUNCH SYSTEM (75) Inventors: Don A. Hart, Albuquerque, NM (US); David W. Geyer, Chandler, AZ (US)

(73) Assignee: Don A. Hart & Associates, Inc., Albuquerque, NM (US)

(*) Notice: Subject to any disclaimer, the term of this patent is extended or adjusted under 35 U.S.C. 154(b) by 0 days.

(21) Appl. No.: 09/792,740

(22) Filed: Feb. 23, 2001

Related U.S. Application Data

(63) Continuation-in-part of application No. 09/211,977, filed on Dec. 15, 1998, now abandoned.
(60) Provisional application No. 60/077,119, filed on Jul. 21, 1998, provisional application No. 60/068,441, filed on Dec. 22, 1997, and provisional application No. 60/068,302, filed on Dec. 19, 1997.

(51) Int. Cl.[7] ................................................. B64G 1/14
(52) U.S. Cl. .................. 244/158 R; 244/160; 244/172; 244/2
(58) Field of Search .................. 244/158 R, 2, 244/160, 172, 162, 135 R (56) References Cited

U.S. PATENT DOCUMENTS

| | | | |
|---|---|---|---|
| 3,261,571 A | 7/1966 | Pinnes | 244/1 |
| 3,295,789 A | 1/1967 | Hill | 244/1 |
| 3,369,771 A | 2/1968 | Walley et al. | 244/1 |
| 3,698,659 A | 10/1972 | Blackstock | 244/1 |
| 3,700,193 A | 10/1972 | Bradley | 244/155 |
| 3,702,688 A | 11/1972 | Faget | 244/155 |
| 3,866,863 A | 2/1975 | von Pragenau | 244/162 |
| 3,929,306 A | 12/1975 | Faget et al. | 244/162 |
| 3,955,784 A | 5/1976 | Salkeld | 244/172 |
| 4,452,412 A | 6/1984 | von Pragenau | 244/172 |
| 4,557,444 A | 12/1985 | Jackson et al. | 244/172 |
| 4,724,738 A | 2/1988 | Johnson | |
| 4,802,639 A | 2/1989 | Hardy et al. | 244/2 |
| 4,807,833 A | 2/1989 | Pori | 244/158 |
| 4,834,324 A | 5/1989 | Criswell | 244/160 |
| 4,998,690 A | 3/1991 | Wustefeld | 244/158 |
| 5,217,187 A | 6/1993 | Criswell | 244/158 |
| 5,402,965 A | 4/1995 | Cervisi et al. | 244/2 |
| 5,615,847 A | 4/1997 | Bourlett | 244/3 |

Primary Examiner—Galen L. Barefoot
(74) Attorney, Agent, or Firm—Law Offices of Ray R. Regan (57) ABSTRACT

A configurable space launch system of multiple different vehicle configurations that use a common reusable spaceplane and cost effective external tanks is presented. Each vehicle configuration in the system incorporates one or more reusable spaceplanes and most or all ascent propellant in multiple releasable external tanks. The flight trajectory of each vehicle has multiple in-flight staging points to increase vehicle performance efficiency. The system is governed and configured by a unique set of eight prescripts that together minimize launch costs.

23 Claims, 4 Drawing Sheets

CONFIGURABLE SPACE LAUNCH SYSTEM

CROSS-REFERENCE TO RELATED APPLICATIONS

As provided in 35 U.S.C. § 119, applicants claim priority to the invention based on the provisional United States patent application filed by Don A. Hart, also known as Donald A. Hart, Jr., a co-inventor named herein, filed in the United States Patent Office on Dec. 19, 1997, under application Ser. No. 60/068,302; to provisional United States patent application filed by David W. Geyer, a co-inventor named herein, filed in the United States Patent Office on Jul. 21, 1998, under Application No. 60/077,119; and provisional United States patent application filed by David W. Geyer, a co-inventor named herein, filed in the United States Patent Office on Dec. 22, 1997, under Application No. 60/068,441.

As provided in 35 U.S.C. §120, applicants claim priority to the earlier filed continuation-in-part application under Ser. No. 09/211,977 filed in the United States Patent and Trademark Office on Dec. 15, 1998, now abandoned.

FEDERALLY SPONSORED RESEARCH AND DEVELOPMENT

None

FIELD OF THE INVENTION

The present invention pertains generally to space launch vehicles. More particularly, the present invention pertains to a configurable space launch system of space launch vehicles. The present invention is particularly, but not exclusively, useful for providing assembly of components of a space launch vehicle selected to accomplish a specific mission or task at the lowest possible cost.

BACKGROUND OF THE INVENTION

Manned and unmanned spacecraft have ventured far beyond Earth and its sensible atmosphere. Space exploration activity has collected valuable data about human and other biological, physiological and psychological reactions to the space environment. Other space exploration activities have greatly expanded our knowledge of Earth, its moon, the solar system and the universe.

Parallel with space exploration activity, substantial use of Earth orbits for military and commercial applications have developed. Presently, the majority of space launches are for military and commercial purposes. Examples include communications satellites, weather satellites, Earth observation satellites, and navigation satellites.

The feasibility and capability to launch spacecraft into Earth orbit, and beyond, clearly has been demonstrated. The size of a space launch vehicle is primarily a function of the payload mass, the apogee of the operational orbit, the perigee of the operational orbit, the inclination of the operational orbit, and the technology applied in the launch vehicle design. The cost of a space launch typically is tens to hundreds of million dollars. Reducing costs, therefore, associated with multiple and frequent space launches is a primary goal of space activity.

Reusability of space launch system components is a logical and presently favored path to lowering the costs associated with a space launch. The U.S. National Aeronautics and Space Administration Space Shuttle is a partially reusable system. The solid rocket booster units associated with the Space Shuttle are recoverable; after a parachute landing of a booster unit in the ocean, parts of a booster may be recycled. The orbiter unit associated with the Space Shuttle has thermal protection, an aerodynamic shape adequate for providing lift in a variety of situations, aerodynamic control surfaces, the capability of entering Earth orbit and returning to Earth's surface for horizontal landing on a runway, and therefore is recoverable intact for later launches. The orbiter unit was the first operational "spaceplane." The third system component of the Space Shuttle is a single external tank, which is expended after each launch. The basic design of the Space Shuttle was done in the 1970's.

At least one principal disadvantage of the manned Space Shuttle is the relatively high cost per flight, which, in fact, is higher than contemporary unmanned expendable launch vehicles of the Atlas, Delta, Ariane and Proton families. Therefore, what has been sought in the industry, but not achieved, is a new configuration with a cost-per-flight lower than contemporary expendable launch vehicles.

Considerable study, analysis and preliminary design activity has focused on a fully reusable single spaceplane. Unfortunately such an approach, while theoretically possible, has been found to be impractical in terms of technological risk. A relatively small increase in the dry weight of the single spaceplace results in an unacceptably large increase in the gross lift-off weight of the vehicle. Further, projected development costs are quite high. Another approach involves two fully reusable spaceplanes of different sizes, one spaceplane being a large reusable booster, and a smaller reusable spaceplane attached to the first in parallel. This approach reduces some of the technological risk associated with a fully reusable single spaceplane, but because two separate reusable spaceplanes must be developed, development costs appear prohibitive.

Over the past decade, numerous alternative efforts have examined various vehicle configurations for lowering the cost-per-flight. The typical result is a concept that requires considerable expense to develop, acquire and operate, that can be applied only to relatively low mass payloads, or both. Therefore, there is a continuing need in the industry for a new, useful and improved space launch system of vehicles that is capable of providing the lowest cost-per-launch possible for a broad spectrum of space launch missions.

The principal components of cost-per-flight are launch site operations, launch range operations, propellant, expendable hardware, turn-around costs for reusable hardware and financial return. At least one way to assess required financial return per flight is the technique of Internal Rate of Return. For example, the development and initial fleet purchase cannot exceed $1.5B if (a) the development period is four years, (b) the operations period is six years, (c) the launch rate is 25 per year, (d) the required Internal Rate of Return is 30%, and (e) the cost per flight is to be fifty percent of contemporary expendable vehicles. That, in turn, emphasizes the need for relatively low development investment and relatively low investment in the initial fleet of reusable hardware.

The present invention responds to the significant challenges in lowering the cost-per-flight of space launchings.

SUMMARY OF THE INVENTION

Although there are many challenges associated with low cost-per-flight space launches, the goal remains achievable. It would be desirable, and of considerable advantage, to provide a space launch system of vehicles that have the lowest cost-per-flight for a broad spectrum of space launch missions. To meet the need for low cost-per-flight, such a system of vehicles should have substantial commonality of components and technology. Each system family member, therefore, would have strong configuration similarities to all other family members. Throughout the decision process of selecting appropriate components for such a space launch system, the investment cost for system development and for initial fleet purchase of reusable components, if any, would be included in predicting cost-per-flight. Applying this overarching rationale, the lowest cost-per-flight is achieved by the present invention, a configurable space launch system.

Briefly, a configurable space launch system, according to the present invention, is a family of distinct vehicle configurations, wherein each configuration includes one or more system-common reusable spaceplanes and a plurality of detachably mounted liquid propellant tanks that are external to the one or more spaceplanes. In extending beyond the existing art, (a) each vehicle configuration excludes ascent propellant tanks permanently installed inside, or integrated into, a reusable spaceplane, and (b) each vehicle configuration is operated in flight such that the number of in-flight staging points, where essentially empty external tanks and/or reusable spaceplanes no longer needed for acceleration thrusting are detached from the vehicle, is greater than the number of reusable spaceplanes in the configuration. The system-common reusable spaceplane has a payload bay dimensioned for the largest projected payload, incorporates one or more main rocket engines, and is capable of entering the Earth's atmosphere for landing. Different vehicle configurations within the space launch system of vehicles will involve variations in the combination of number of spaceplanes; the number, size, and location of external tanks; and the number of in-flight staging points. The resulting space launch system is configurable because a vehicle configuration may be tailored for specific missions at optimal low cost-per-flight.

As used in this document, a "space launch vehicle" travels from the surface of the Earth to Earth orbit and is comprised of one or more common spaceplanes and multiple external tanks.

A "spaceplane" is a component of the space launch vehicle, and is, at least, fully reusable by returning from orbit and landing intact, has an aerodynamic shape appropriate for atmospheric entry and flight and landing, can maneuver in space, has an aft compartment for main rocket propulsion, contains sensors and electronics for navigation and guidance, and has a bay for mission specific payloads and equipment.

An "external tank" contains ascent liquid propellant that is expended during flight to Earth orbit, and is detachably mounted external to the spaceplane or spaceplanes.

An "in-flight staging point" is an event in a vehicle's flight where essentially empty external tanks, or spaceplanes no longer needed to provide thrust, are released from the space launch vehicle.

A "vehicle configuration" is the specific sizing, assembly arrangement, and cooperative attachments of the one or more spaceplanes and the external tanks.

"Configurability" and "configure" and "configured" mean the capability to judiciously select a number of common spaceplanes, a number of variously sized external tanks and a number of in-flight staging points such that the resulting vehicle configuration will have optimal low cost-per-flight for a specific launch mission.

A "configurable space launch system" is a set of vehicle configurations that use common spaceplanes and cost effective external tanks to provide a broad range of payload mass, payload volume, and destination orbits for low cost transportation to Earth orbit.

A vehicle's "configuration governing prescripts" is a unique set of prescripts governing all vehicle configurations comprising a configurable space launch system. The present invention reduces cost per flight by assembling a configurable space launch system of vehicles that satisfies the configuration prescripts, which include:

1. All vehicles incorporate one or more common reusable spaceplanes and multiple external ascent propellant tanks (collectively, "vehicle components"). Ascent propellant is the energy source for lift-off and acceleration to orbital velocity. This provides high vehicle efficiency (ratio of payload weight to vehicle gross lift-off weight) because of staging advantages and provides higher vehicle mass fractions (propellant weight to vehicle gross weight).

2. 90–100 percent of total ascent propellant volume is located in the external tanks. 0–10 volume percent may be in easily removable auxiliary tanks in a spaceplane payload bay, if space is available. Analyses by the inventors have demonstrated that placing propellant inside a spaceplane decreases vehicle performance and increases vehicle cost-per-flight. The performance decrease stems from the much larger volume of a spaceplane that contains large volumes of propellant; that volume increase requires more structure, thermal protection, landing gear and control surfaces, all leading to a spaceplane weight increase that is considerably greater than the dry weight of external tanks. The cost increase of placing large amounts of propellant inside a spaceplane results in higher development cost, higher production cost and higher turnaround (between flights) cost for a larger spaceplane. By placing ascent propellant in external tanks, vehicle performance, depending on other configurability objectives, may be increased through additional vehicle in-flight staging points where essentially empty tanks are released.

3. The number of in-flight staging points in the flight trajectory is greater than the number of spaceplanes in the vehicle configuration. Sequencing an empty-then-drop scheme for external tanks provides additional staging. For example, a vehicle using two reusable spaceplanes may have three or more "stages" of powered flight. Staging is well-established practice in missiles and space launch vehicles to improve efficiency because less vehicle gross weight means lower cost. Further, staging significantly reduces the performance and cost penalties of increases in dry weight of reusable spaceplanes. A person practicing the present invention, therefore, has more latitude to use proven technology with an attendant reduction in risk; lower development risk generally results in lower development costs. This prescript leaves open the option to use already space-qualified subsystems, further decreasing development costs and risks. An example is to use the existing Space Shuttle Main Engine in the spaceplanes of the present invention.

4. All vehicle configurations in the configurable space launch system of vehicles use a common spaceplane. This reduces spaceplane development costs. As additional vehicle configurations for different missions are selected, the spaceplane will be considered a space-qualified component.

5. All vehicle configurations in the configurable space launch system use cost effective external tanks. This lowers development costs and allows economies of scale (for example, a single factory for all shapes and sizes of tanks).

6. No permanently mounted or integrated ascent propellant tanks are installed inside a spaceplane. Internal tanks increase volume and complexity of the spaceplane and create more surface area that must have thermal protection. Such tanks increase weight that the spaceplane structure must carry, leading to increased cost of spaceplane development and production.

7. The spaceplane has a bay sized no larger than the major dimensions of the maximum sized mission-specific cargo anticipated to be carried to orbit. This minimizes size of a spaceplane, and decreases spaceplane development and production cost.

8. Different vehicle configurations within the configurable space launch system have variations in the combination of the number of spaceplanes, the number and size and location of external tanks, and the number and sequencing of the in-flight staging points. This is a principal objective of configurability. At relatively low cost, a new system family member may be added to provide low cost launches for a new set of mission requirements.

Unlike what is known in the present art, the present invention incorporates all eight prescripts in all vehicle configurations in a configurable space launch system.

In accordance with the present invention, therefore, a low cost-per-flight configurable space launch system becomes a family of launch vehicles of varying configurations using a common spaceplane and cost effective external tank tanks. The various launch vehicles provide a launch capability for a broad range of user requirements for payload mass and destination orbit.

All the vehicles in the family have one or more common reusable spaceplanes and multiple detachably mounted external ascent propellant tanks. The one or more spaceplanes and the multiple external tanks are mechanically connected to maintain structural rigidity. The mechanical connections incorporate quick-release mechanisms to allow disengagement during flight. The release mechanisms may be pyrotechnic, electro-mechanical, or other appropriate mechanism.

A spaceplane is reusable in part because, after a mission in space, a spaceplane may be returned to Earth and used again on another mission. A spaceplane is not considered an expendable system component of the configurable space launch vehicles of the present invention. A spaceplane also includes at least one rocket engine. At least one purpose for the engine or engines on a spaceplane is to provide thrust for lift-off from a substantially vertical orientation and acceleration to orbital velocities. A spaceplane engine also may assist in decelerating the spaceplane for de-orbit, and in maneuvering the spaceplane while in orbit. Each engine on a configurable space launch vehicle, according to the present invention, may be removed from a spaceplane, or may be installed or reinstalled in a spaceplane, thus enhancing the configurability of the space launch vehicle. In addition, each engine on a spaceplane may be repositioned on a spaceplane having multiple substantially identical engines.

The shape of a spaceplane is not pertinent to the present invention. A spaceplane, according to the present invention, as a vehicle component of a space launch vehicle, includes an aerodynamic shape adequate for providing lift in a variety of situations, has control surfaces, has the capability of entering space and returning to Earth's surface, is recoverable intact, and is reusable in additional space launch missions with minimum post-mission maintenance and repair. Any number of spaceplane shapes, therefore, is possible. A spaceplane may include a body with at least one wing. A spaceplane with at least one wing may be maneuvered to land on Earth horizontally. As a nonexclusive alternative, a spaceplane may be a lifting body, one example of which may be substantially triangular shape from a top view. Such a version of a spaceplane may also include surface controls such as protruding stability control apparatus that also may give the spaceplane the ability to land on Earth horizontally. Alternatively, a spaceplane may have a substantially conical shape having surface controls permitting a spaceplane to land on earth in a substantially vertical orientation. As a vehicle component of a space launch vehicle, a spaceplane, therefore, according to the present invention, may have any aerodynamic shape.

A spaceplane, according to the present invention, includes a payload bay. A payload bay may be sized consistent with the major dimensions of the maximum sized cargo anticipated to be carried to orbit. A payload bay shall have the capability to contain deliverable cargo, returnable cargo, on-orbit mission equipment, a crew module, a passenger module, a propulsion kit for atmospheric cruise thrusting of a non-orbiting spaceplane that has been released at an early in-flight staging point, easily removable auxiliary ascent propellant tank or tanks, or special mission-specific spaceplane equipment or combinations thereof. Part of the outside surface of the crew and passenger module may be the outside surface of the spaceplane; all or part of the payload bay doors would be removed to accommodate the modules.

Unlike what is known in the art, the present invention does not use a propulsion kit for ferrying a spaceplane from a distant downrange runway back to the vicinity of the space launch site. In the present invention, a propulsion kit is used only for atmospheric cruise thrusting to extend the range of a non-orbiting spaceplane that has been released at an early in-flight staging point and is returning directly to the vicinity of the launch site. Therefore, a propulsion kit of the present invention does not require relatively high thrust air-breathing jet engines for takeoffs and climb to altitude.

To minimize size and reduce costs of the spaceplanes, unlike what is provided in the present art, no ascent propellant tanks are permanently installed in or integrated into the spaceplane basic structure or the spaceplane bay. A smaller spaceplane will require less structure, less thermal protection for atmospheric entry, and less power for control surface actuation, all contributing to less spaceplane cost and greater vehicle efficiency (the ratio of payload/cargo to the vehicle gross weight at liftoff). A smaller vehicle is a less costly vehicle.

A configurable space launch vehicle according to the present invention will also include multiple external propellant tanks. An external propellant tank may be a recoverable or expendable vehicle component. An external propellant tank, according to the present invention, may be used for fuel, for oxidizer, or for a combination of fuel or oxidizer. After the mission-specific combination of fuel and oxidizer in an external propellant tank are used, an external propellant tank may be jettisoned from the space launch vehicle. Jettisoning tanks is an in-flight staging point. The mass to be carried from the staging point onward is significantly reduced. Staging improves vehicle efficiency, and, hence, lowers costs. An external propellant tank may be mounted on and detached from a spaceplane, may be mounted on and detached from one or more other external tanks, may be mounted on and detached from one or more other spaceplanes, and may be mounted on and detached from any vehicle or system component of the present invention to provide the configurability needed for a specific mission or task. Configurability of the present invention includes the capability of mounting an external propellant tank on, or detaching it from, an upper surface of a wing of a spaceplane. An external propellant tank also may be mounted on and detached from a lower surface of a wing of a spaceplane. In yet another configuration, an external propellant tank may be mounted on and detached from a surface of the body of a spaceplane, regardless of the shape of a spaceplane, and regardless of whether a particular spaceplane is equipped with a wing. The capability to configure a space launch vehicle, according to the present invention, permits a wide variety and a number of variations in the assembly and positioning of external tanks and aft mounted engines on a spaceplane. A nonexclusive example of the configurability of the present invention is the ability to mount external propellant tanks on a spaceplane, on a surface of a wing of a spaceplane, and on the belly surface of a fuselage of a spaceplane. Likewise, an external tank may be mounted on any surface of a spaceplane not equipped with a wing.

A nonexclusive sample configuration of a configurable space launch vehicle according to the present invention includes what may be described as a "twin" configuration. A configurable space launch vehicle having a twin configuration may include a first common reusable spaceplane. The first common reusable spaceplane includes at least one engine. The twin configuration also includes a second common reusable spaceplane. The second common reusable spaceplane also has at least one engine. A second common reusable spaceplane is capable of being connected to, and decoupled from, a first reusable spaceplane and an external tank or tanks. A twin configuration of the present invention, consisting in part of a first common reusable spaceplane and a second common reusable spaceplane, may be launched from a substantially vertical position. In a twin configuration of the present invention, the first reusable spaceplane and the second reusable spaceplane will include a payload bay.

In the twin configuration, the engine or engines in the first common reusable spaceplane and the second common reusable spaceplane may be installed in or removed from each spaceplane. Likewise, a configurable space launch vehicle, according to the twin configuration of the present invention, includes a first and second common spaceplane in which each engine on the first spaceplane and second spaceplane may be repositioned on each of the spaceplanes.

In a twin configuration of the present invention, one or more external propellant tanks may be mounted on and detached from the first spaceplane or mounted on and detached from one or more other external propellant tanks. Likewise, one or more external propellant tanks may be mounted on and detached from the second common spaceplane or mounted on and detached from one more other external propellant tanks. For example, one or more external propellant tanks may be mounted to and detached from the upper surface of a wing of the first common reusable spaceplane. One or more external propellant tanks also may be mounted to and detached from the upper surface of a wing of the second common reusable spaceplane. In addition, or alternatively, given the configurability of the present invention, one or more external propellant tanks may be mounted to and detached from the lower surface of a wing of the first common reusable spaceplane. Alternatively, or in addition, one or more external propellant tanks may be mounted on and detached from the lower surface of a wing of the second common reusable spaceplane. Alternatively, or in addition, one or more external propellant tanks may be mounted on and detached from the body of the first common reusable spaceplane as well as the body of the second common reusable spaceplane. The capability to configure a space launch vehicle, according to the present invention, permits a wide variety and a number of variations in the assembly of external tanks in connection with the configurable space launch vehicle. At least one nonexclusive example of the configurability of the present invention is the ability to mount external propellant tanks underneath the spaceplane, on a lower surface of a wing or wings of a spaceplane and on the belly surface of the body of a spaceplane. The configuration of two common reusable spaceplanes in combination with multiple separable external propellant tanks provides several advantages. Comparatively smaller spaceplanes may be used in a twin configuration because most or all of the propellant is external to the spaceplane. External propellant tanks enhance performance characteristics of the configurable space launch vehicle, and contribute to reduction in size of the common spaceplane.

The flight trajectory of the twin configuration may involve three in-flight staging points. For example, after lift-off the propellant mass consumed in both spaceplanes' engines decreases the instantaneous gross mass of the vehicle. When the thrust of the second common spaceplane is sufficient for continued acceleration, the first common spaceplane and any essentially empty external tanks may be jettisoned; that is the first in-flight staging point. The jettisoned spaceplane may aerodynamically maneuver into a flight path to return to a landing runway, possibly near the launch site. The spaceplane, when descending to an appropriate cruise altitude, may be assisted by air-breathing jet engines mounted on the spaceplane bay doors or deployed from inside the spaceplane bay. Unlike what is known in the art, the present invention does not rely on deployable wings, fins, rotors, or propellers. These relatively low thrust engines will be for the purpose of maintaining cruise altitude and extending the range of the return flight. The jettisoned external tanks will follow a free fall ballistic trajectory until impacting the Earth's surface, either on water or ground. Alternatively, the external tanks may deploy parachutes to provide a softer impact and allow recovery and reuse. The second spaceplane and remaining external tanks will perform a second powered flight acceleration segment. At an appropriate point, essentially empty external tanks are jettisoned; this is the second in-flight staging point. The external tanks follow a ballistic path to the Earth's surface. The second spaceplane, which contains mission payload, and the remaining external tanks, perform the third powered flight acceleration segment into the mission orbit. The now essentially empty external tanks are jettisoned and de-orbited, or may be jettisoned on the second spaceplane's return flight; this is the third in-flight staging point. In a manner similar to that just described, multiple in-flight staging points may be sequenced for other vehicle configurations. Unlike what is known in the art, the present invention requires, as part of the configuration governing prescripts, that the performance advantage of staging be incorporated beyond the classic concept of "boosters" separating from "upper stages".

Configurability of the space launch system permits operators to select a vehicle configuration that is most cost effective for a particular mission's requirements for payload mass and mission orbital parameters. Using calculations, formulae, algorithms, software and hardware well known in the art, the operator determines the lowest cost-per-flight vehicle by examining various combinations of number of common reusable spaceplanes, number and size of external tanks, the arrangement, positioning and attachment assembly of the spaceplanes and external tanks, and the number and sequencing of in-flight staging points.

Figure 5:
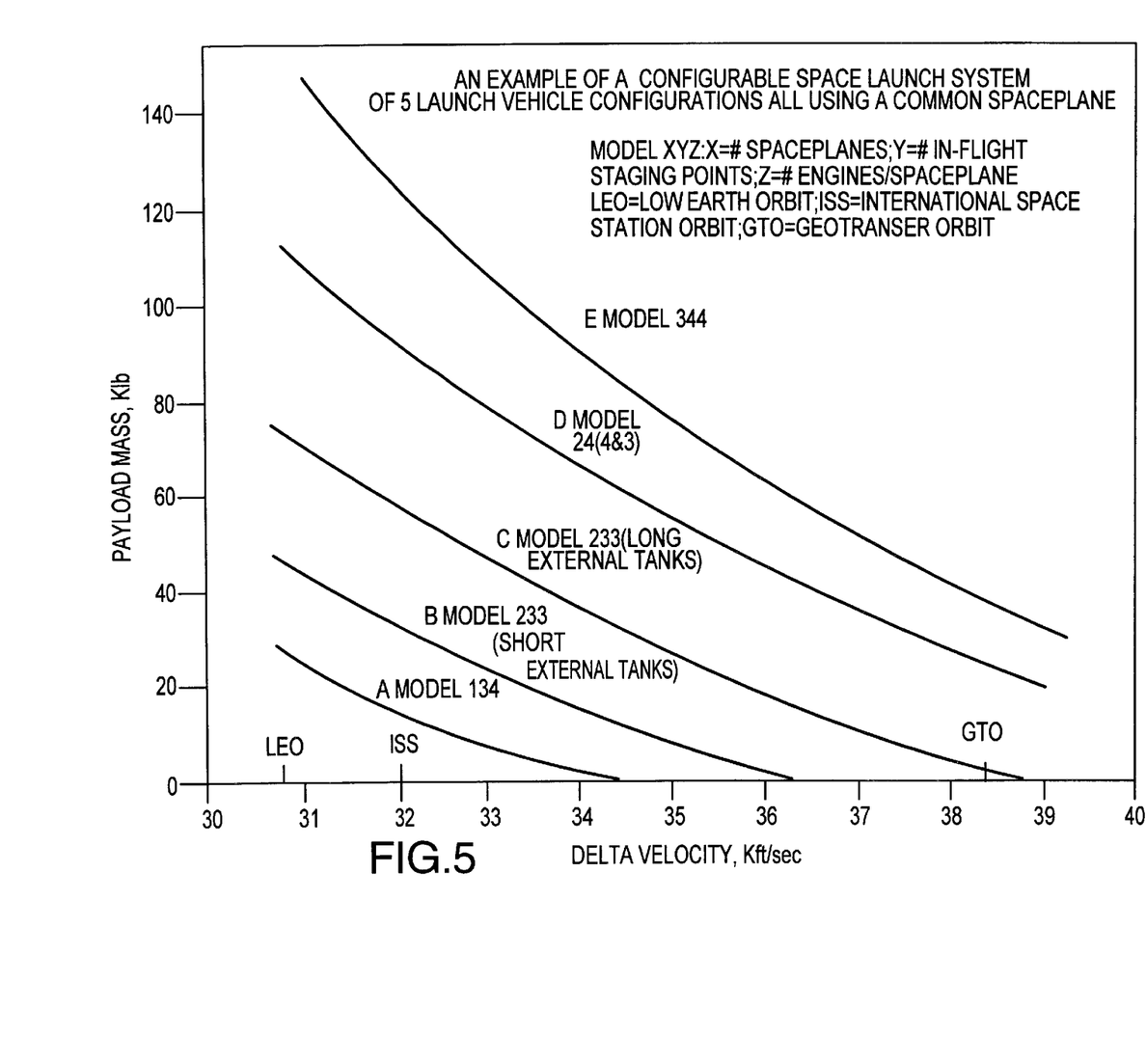
FIG. 5 is a plot graph depicting performance calculations for selecting a representative configurable space launch system having five vehicles.

In light of the above, an advantage of the present invention is a configurable space launch system having a wide spectrum of mission capabilities through selection of the lowest cost-per-flight vehicle configuration within the configurable space launch system of vehicle configurations for individual mission requirement. This advantage is illustrated in FIG. 5 that shows an example of a configurable space launch system having five vehicle configurations.

The use of a common spaceplane for all vehicle configurations provides several advantages. Because only one spaceplane is developed or selected, development cost is lowered. The one common spaceplane has no permanently mounted or integrated internal ascent propellant tanks and has a payload bay just large enough for the maximum sized payload; the spaceplane size is minimized and development and production costs are lowered. Operational costs are lowered not only because of commonality, but also because after the return of any reusable spaceplane, the spaceplane will be inspected, maintained as needed, and the payload bay will be outfitted for any specific next mission.

Another advantage of the present invention is a configurable space launch system that may be used for manned or unmanned space activity using a variety of common vehicle components to minimize development costs and time, to minimize learning curves because technology for vehicle components already is known to users in the industry, and to permit earlier low cost operational capability.

Another advantage of the present invention is a configurable space launch system having a significant variable range of thrust to satisfy requirements of different and differing missions to be achieved in space.

Another advantage of the present invention is a configurable space launch system with vehicle components that may be selected from a wide array of known, proven, and inexpensive technology so as to reduce the costs of a given mission or task while using technology that has been proven to be effective.

Yet another advantage of the present invention is a configurable space launch system for which expendable hardware may be designed using less expensive materials.

Another advantage of the present invention is a configurable space launch system, and a method for configuring such a system, which respectively are easy to use and to practice, and which are cost effective for their intended purposes.

These and other objects, features, and advantages of such a configurable space launch system that will become apparent to those skilled in the art when read in conjunction with the accompanying detailed description, drawing figures, and appended claims.

The foregoing has outlined broadly the more important features of the invention to better understand the detailed description, which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of descriptions and should not be regarded as limiting.

As those skilled in the art will appreciate, the conception on which this disclosure is based may be readily used as a basis for designing other structures, cooperation of structure, methods, and systems for carrying out the purposes of the present invention. The claims, therefore, include such equivalent constructions to the extent that equivalent constructions do not depart from the spirit and scope of the present invention.

The abstract associated with this disclosure is neither intended to define invention, which is measured by the claims, nor intended to be limiting as to the scope of the invention in any way.

The novel features of this invention, and the invention itself, both as to structure and method, are best understood from the accompanying drawing, considered in connection with the accompanying description of the drawing, in which similar reference characters refer to similar parts, and in which:

DESCRIPTION OF THE PREFERRED EMBODIMENTS

Figure 1:
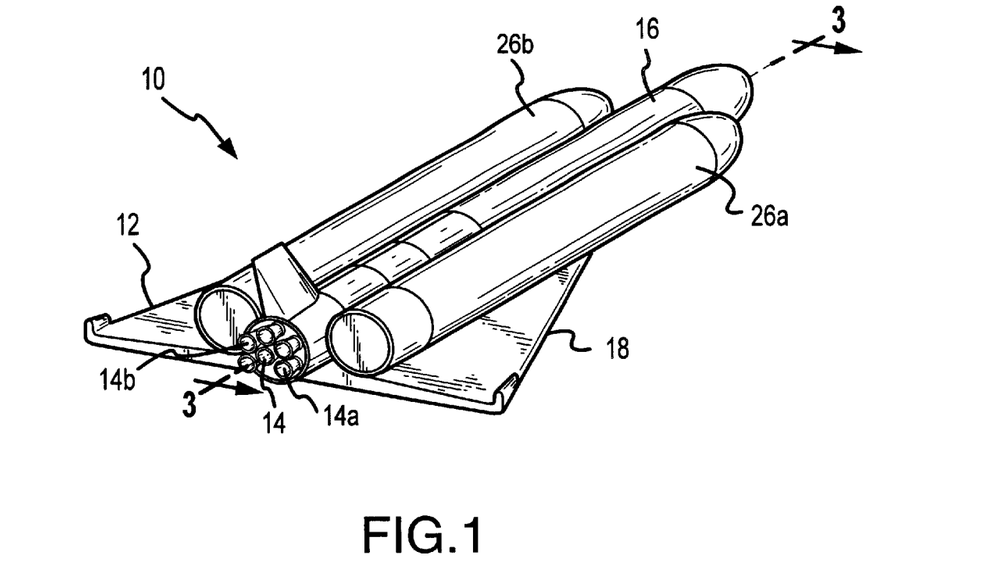
FIG. 1 is a perspective view of one embodiment of a configurable space launch vehicle according to the present invention, showing use of one common reusable spaceplane and multiple external tanks.

Referring initially to FIG. 1, a configurable space launch vehicle is shown and generally designated 10. As shown, configurable space launch vehicle 10 includes a common reusable spaceplane 12. Spaceplane 12 may be any of a variety of aerodynamic shapes. Spaceplane 12 is reusable because, after a mission in space, spaceplane 12 may be returned to Earth and used again in connection with another mission in space. Spaceplane 12 is not considered an expendable vehicle component of configurable space launch vehicle 10 of the present invention. As shown by reference to FIG. 1, spaceplane 12 also includes at least one engine 14. A purpose of engine 14 or a combination of any number of engines 14a and 14b, as shown in FIG. 1, is to power spaceplane 12 to lift-off and accelerate configurable space launch vehicle 10 to orbital velocity. Engine 14 also may assist in decelerating spaceplane 12 for de-orbit, and in maneuvering spaceplane 12 into various orbits. Engine 14 on configurable space launch vehicle 10, according to the present invention, may be removed from spaceplane 12, and may be installed or reinstalled in spaceplane 12, thus enhancing the configurability of configurable space launch vehicle 10. In addition, each engine 14 on spaceplane 12 may be repositioned on spaceplane 12.

The precise shape of spaceplane 12 is not pertinent to the present invention. Spaceplane 12, according to the present invention, as a vehicle component of configurable space launch vehicle 10, includes an aerodynamic shape adequate for providing lift in a variety of situations, has control surfaces, has the capability of entering space and returning to Earth's surface, is recoverable intact, and is reusable in space launch missions with minimum post-mission maintenance and repair. Any number of shapes of spaceplane 12, therefore, is possible. Spaceplane 12 may include a body 16 with at least one wing 18 as shown in FIG. 1. Spaceplane 12 with at least one wing 18 may be maneuvered to land on Earth substantially horizontally. As a nonexclusive alternative, spaceplane 12 may have a lifting body shape (not shown), one example of which may be substantially triangular in shape from a top plan view, that may also include surface controls such as protruding stability control apparatus that also may enhance the ability of spaceplane 12 to land on Earth substantially horizontally. As a nonexclusive alternative, spaceplane 12 may also have a substantially conical shape (not shown) having surface controls permitting spaceplane 12 to land on Earth in a substantially vertical orientation. A vehicle component such as spaceplane 12, therefore, according to the present invention, may have any aerodynamic shape.

Figure 3:
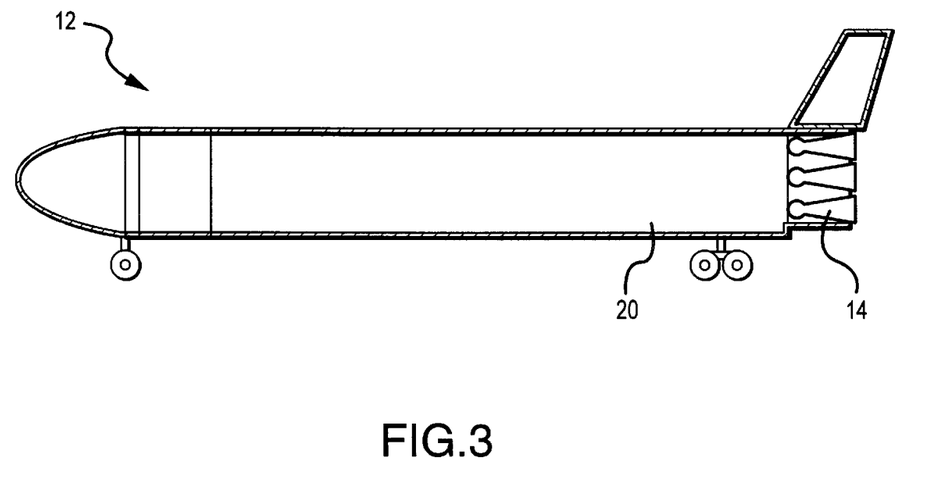
FIG. 3 is a sectional view along the line 3—3 of FIG. 1.

Spaceplane 12, according to the present invention, as shown in FIG. 3, also may include at least one bay 20, but may include more than one bay 20. Bay 20 of spaceplane 12 may be equipped to carry a variety of payloads, to return a variety of payloads to Earth, to house one or more auxiliary ascent propellant tanks, to house one or more propulsion kits for atmospheric cruise, to house a crew module, to house a passenger module, or for any number and combination of alternative uses, which in turn allows configurable space launch vehicle 10 of the present invention to perform any number of tasks. Because of configurability of the present invention, configurable space launch vehicle 10 may be assembled to perform a specific mission or task at lowest possible cost. Size of bay 20 or weight of the contents of bay 20, therefore, is not a limitation on the present invention.

To hold down the costs for configurable space launch vehicle 10, the size of bay 20 is limited to the major dimensions of the anticipated largest cargo to be carried into space; with such a large cargo, all of bay 20 would contain payload.

Figure 2:
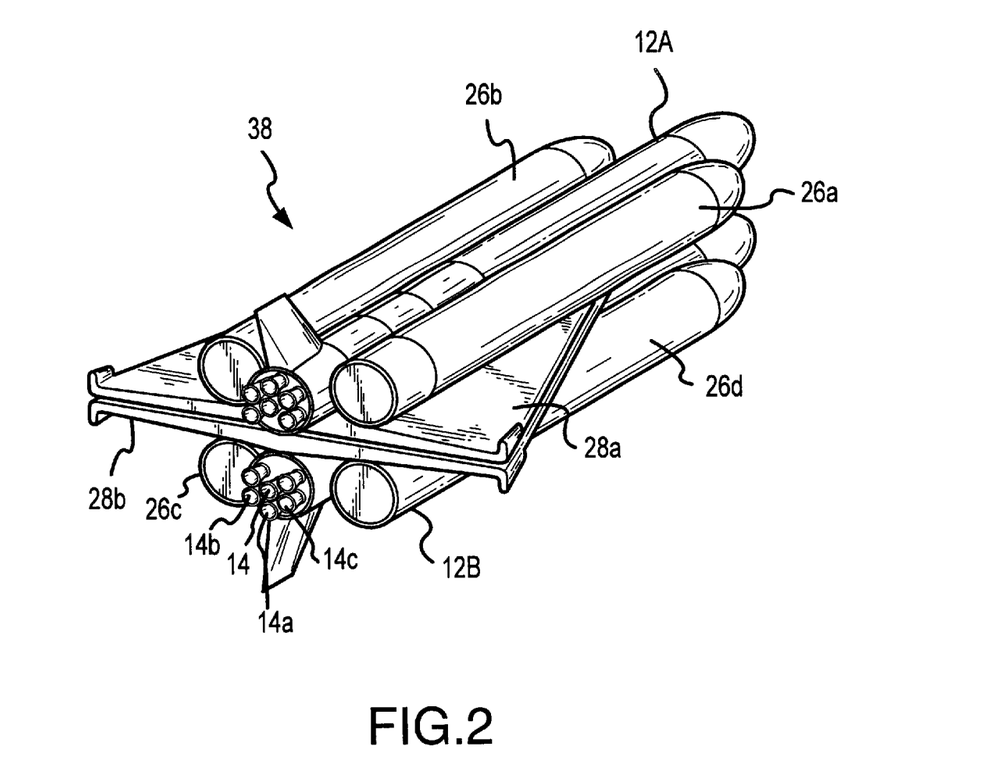
FIG. 2 is a perspective view of the configurable space launch vehicle, according to the present invention, showing use of two common reusable spaceplanes in a "twin" configuration and one of many configurations of use of multiple external propellant tanks.
Figure 4A:
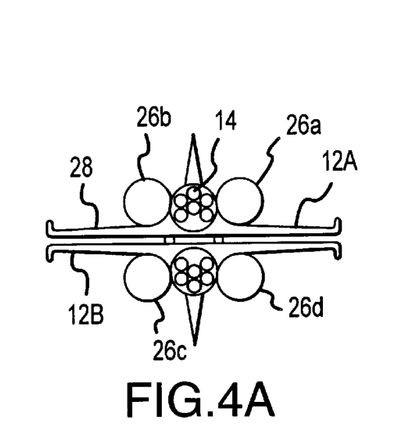
FIG. 4 is a composite schematic drawing of a representative but not exclusive number of vehicle configurations of the present invention.
Figure 4B:
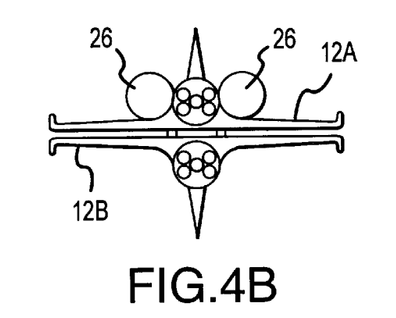
Figure 4C:
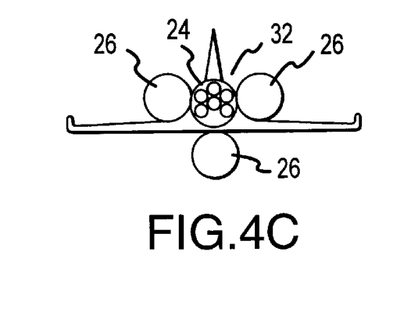
Figure 4D:
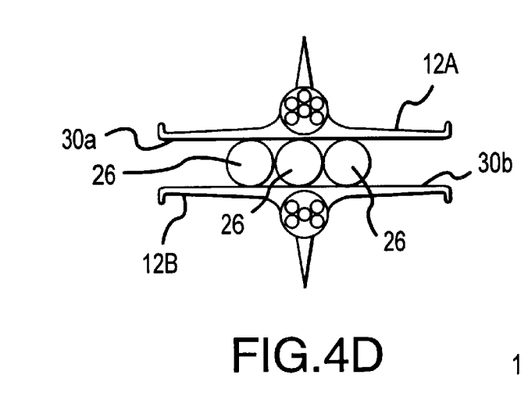

Configurable space launch vehicle 10 according to the present invention may also include one or more external propellant tanks 26 as shown best by FIG. 1. External propellant tank 26 is considered to be a component of configurable space launch vehicle 10. External propellant tank 26, according to the present invention, may be used for fuel, for oxidizer, or for a combination of separate fuel and oxidizer tanks. After propellant in external propellant tank 26 is emptied, external propellant tank 26 may be jettisoned from configurable space launch vehicle 10. External propellant tank 26 may be mounted on and detached from spaceplane 12, may be mounted on and detached from one or more other external tanks, may be mounted on and detached from one or more of another spaceplane 12 as shown in FIG. 2, and may be mounted on and detached from any vehicle component of the present invention to provide the configurability needed for a specific mission or task. Configurability of the present invention also may be achieved by mounting external propellant tank 26 on an upper surface 28 of wing 18 of spaceplane 12 as also shown in FIG. 1. External propellant tank 26 also may be mounted on and detached from a lower surface 30 of wing 18 of spaceplane 12 as shown in FIG. 4D. In yet another configuration, external propellant tank 26 may be mounted on and detached from a surface 32 of a body 24 of spaceplane 12 as shown in FIG. 4C, regardless of the shape of spaceplane 12, and regardless of whether spaceplane 12 is equipped with wing 18. The capability to configure configurable space launch vehicle 10, according to the present invention, permits a wide range of use of multiple external propellant tanks 26 and one or more aft mounted engines14 on spaceplane 12. A nonexclusive example of the vehicle configurability of the present invention is the ability to mount external propellant tank 26 or external propellant tanks 26a, b beneath spaceplane 12, on the lower surface of one or more wings 18 of spaceplane 12, or on the belly surface of spaceplane 12, as best shown by cross-reference between FIGS. 3, 4A, 4B, 4C, 4D and 4F. Likewise, external propellant tank 26 may be mounted on any surface of spaceplane 12 not equipped with wing 18.

A nonexclusive alternative embodiment of configurable space launch vehicle 10, according to the present invention, includes what may be described as a "twin" configuration 38 shown in FIG. 2. Configurable space launch vehicle 38 having a twin configuration may include a first common reusable spaceplane 12A. First common reusable spaceplane 12A includes at least one engine 14c. Engine 14c performs all functions of the embodiment of the present invention described in connection with the use of one spaceplane. Twin configuration 38 also includes a second common reusable spaceplane 12B. Second common reusable spaceplane 12B also has at least one engine 14c that also may perform all of the functions of the embodiment of the present invention described in connection with the use of one spaceplane 12. Second common reusable spaceplane 12B is capable of being connected to, and decoupled from, first common reusable spaceplane 12A. Twin configuration 38 of the present invention, consisting in part of first reusable common spaceplane 12A and second common reusable spaceplane 12B, may be launched from a substantially vertical position. In twin configuration 38 of the present invention, first common reusable spaceplane 12A and second common reusable spaceplane 12B will include at least one bay 20. Engines 14c and 14d as shown in FIG. 2 may be installed in or removed from each spaceplane 12A and 12B. Likewise, configurable space launch vehicle 10, according to twin configuration 38 of the present invention, includes a first common reusable spaceplane 12A and second common reusable spaceplane 12B in which each engine 14 on first common reusable spaceplane 12A and second common reusable spaceplane 12B may be repositioned on each of first common reusable spaceplane 12A and second common reusable spaceplane 12B.

Figure 4E:
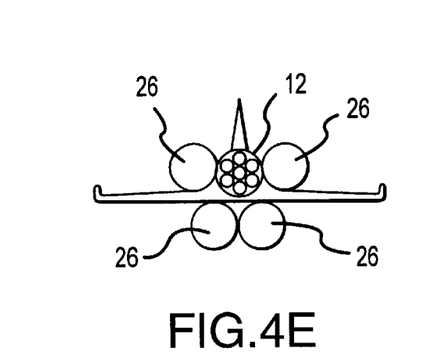
Figure 4F:
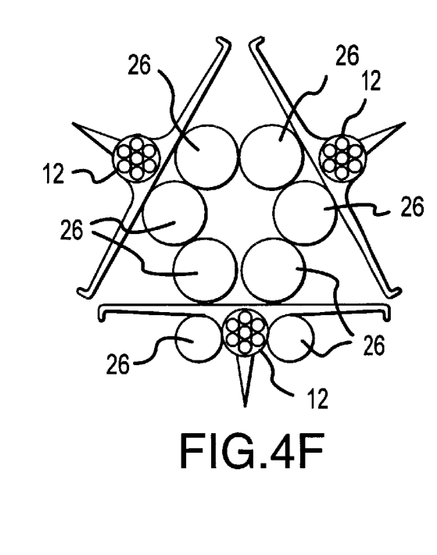

As shown in FIG. 2, in twin configuration 38 of the present invention, one or more external propellant tanks 26 a, b may be mounted on and detached from the first common reusable spaceplane 12A or mounted on and detached from one more other external propellant tanks 26 as shown in FIGS. 4D, 4E and 4F. Likewise, one or more external propellant tanks 26 c,d may be mounted on and detached from second common reusable spaceplane 12B or mounted on and detached from one more other external propellant tanks 26 as shown in FIGS. 4D, 4E and 4F. One or more external propellant tanks 26 may be mounted to and detached from upper surface 28a of wing 18 of the first common reusable spaceplane 12A. One or more external propellant tanks 26 also may be mounted to and detached from upper surface 28b of wing 18 of second common reusable spaceplane 12B. In addition, or alternatively, given the configurability of the present invention, one or more external propellant tanks 26 may be mounted to and detached from the lower surface 30a of wing 18 of first common reusable spaceplane 12A as shown in FIG. 4D. Alternatively, or in addition, one or more external propellant tanks 26 may be mounted on and detached from lower surface 30b of wing 18 of second common reusable spaceplane 12B as shown in FIG. 4D. Alternatively, or in addition, one or more external propellant tanks 26 may be mounted on and detached from the body of first common reusable spaceplane 12A as well as the body of second common reusable spaceplane 12B as shown best by cross-reference between FIGS. 2 and 4A.

The capability to configure configurable space launch vehicle 10, according to the present invention, permits a wide range of assemblies, positions and configurations of external tanks 26 in connection with configurable space launch vehicle 10. The configuration of two common spaceplanes 12A and 12B, or the configuration of multiple common spaceplanes 12 as shown in FIG. 4F, in combination with multiple separable external propellant tanks 26, provides several performance and cost advantages over current space launch vehicles. The in-flight separation of empty external propellant tanks 26 enhances performance characteristics of configurable space launch vehicle 10. External tanks 26 contribute to reduction in size of spaceplane 12 used in twin configuration 38 or in multiple spaceplane configurations as shown by way of example in FIG. 4F. Further, configurability of the space launch system permits operators to rapidly select a reconfigured launch vehicle for a particular payload, a particular mission, and in a particular size and weight most cost effective for the mission. Using calculations, formulae, algorithms, software and hardware well known in the art, calculations are possible for computing optimal weight of configurable space launch vehicle 10, optimal amounts of propellant to achieve the individual and collective launch and flight phases, optimal size and shape of external tanks, optimal number of spaceplanes, and optimal number of in-flight staging points, associated with specific space missions.

One of the many remarkable features and results of the present invention in twin configuration 38 is the option for increased staging that provides improved vehicle efficiency that, in turn, leads to lower cost. At least one nonexclusive example is the sequence of a first powered flight segment wherein all engines on spaceplanes 12A and 12B are fed from external tank 26A, followed by release of external tank 26A, followed by a second powered flight segment wherein engines 14 on spaceplanes 12A and 12B are fed by external tank 26B, followed by separation of spaceplane 12A and for its flight back to a landing site near the launch site, followed by the release of external tank 26B, followed by a third powered flight segment wherein engines 14 on spaceplane 12B are fed by external tank 26C, followed by the release of external tank 26C, followed by a fourth and final powered flight segment wherein engines 14 on spaceplane 12B are fed by external tank 26D until orbital velocity is achieved. During the sequence, engines 14 would be throttled and vectored to compensate for shifts in vehicle center of gravity. After on-orbit operations, spaceplane 12B will de-orbit, release external tank 26D, and return to the landing site near the launch site. The four distinct powered flight stages will significantly reduce the vehicle 38 gross weight, leading to lower cost for the launch.

The advantages of configurable space launch vehicle 10, according to the present invention, will be apparent to one skilled in the art. Use of technology for vehicle components that are already known in the art translates to lower risk and lower cost than creating an entirely new system. External propellant tanks 26 may be used from existing inventory and/or technology. In addition, the more costly system components of configurable space launch vehicle 10 are reusable, while less costly components are or may be expendable. The least costly configurable space launch vehicle needed for a specific mission or task may be assembled. Not only is a configurable space launch system flexible in view of present technology, a configurable space launch system indicates ready incorporation of future cost effective technologies.

The advantage of having a set of distinct space launch vehicles in the configurable space launch system of the present invention is apparent in FIG. 5 that displays the performance of five vehicle configurations using the prescripts of the present invention. The specifics of configuration are also displayed. As in all configurable space launch systems according to the present invention, a common reusable spaceplane is used in all vehicle configurations. For the performance calculations, the propellant combination is liquid oxygen and liquid hydrogen; each engine has a sea-level thrust of 350,000 pounds force. A launch operator selects the lowest cost-per-flight configuration to accomplish a specific launch mission, which is a point on the FIG. 5 plot. Moving alphabetically from A to E is moving to increasingly larger vehicles and, hence, increasingly higher cost-per-flight. A launch operator has an additional option, which is to define a sixth vehicle configuration that exactly matches a mission point on the FIG. 5 plot.

While the configurable space launch vehicles shown are embodiments of the present invention, they are a nonexclusive representative set of examples of the invention, are not intended to be exclusive, and are not limitations of the present invention.

Although the particular configurable space launch vehicles as shown and disclosed in detail in this instrument is fully capable of obtaining the advantages stated, this disclosure is merely illustrative of the presently preferred embodiments of the invention, and no limitations are intended in connection with the details of construction, design or composition other than as provided and described in the appended claims.

What is claimed is:

1. A method for providing a low-cost-per-flight configurable space launch system of a plurality of space launch vehicles, comprising:
    selecting a reusable spaceplane wherein the reusable spaceplane selecting step includes at least the substep of excluding any permanently installed or integral ascent propellant tanks within the reusable spaceplane;
    combining for each space launch vehicle in the configurable space launch system, one or more reusable spaceplanes with a plurality of liquid propellant tanks detachably mounted external to the one or more reusable spaceplanes;
    supplying more than 90 percent of total ascent propellant volume in the detachably mounted external tanks;
    including means for achieving a plurality of in-flight staging points greater than the number of spaceplanes; and
    configuring the plurality of space launch vehicles to perform a broad spectrum of space launch missions at optimal low cost-per-flight.

2. A method for providing a low cost-per-flight configurable space launch system of a plurality of space launch vehicles as recited in claim 1, wherein the reusable spaceplane selecting step includes the substeps of:
    including a payload bay in the reusable spaceplane; and
    sizing the payload bay to the maximum cargo dimensions.

3. A method for providing a low cost-per-flight configurable space launch system of a plurality of space launch vehicles as recited in claim 1, wherein the reusable spaceplane selecting step includes the substep of emplacing at least one removable main rocket engine for ascent acceleration in the reusable spaceplane.

4. A method for providing a low cost-per-flight configurable space launch system of a plurality of space launch vehicles as recited in claim 1, wherein the reusable spaceplane selecting step includes the substep of providing the reusable spaceplane with an aerodynamic shape and control surfaces appropriate for entry into Earth's atmosphere and landing intact.

5. A method for providing a low cost-per-flight configurable space launch system of a plurality of space launch vehicles as recited in claim 1, wherein the reusable spaceplane selecting step includes the substep of providing the reusable spaceplane with guidance, navigation, altitude and position control, maneuver, de-orbit, and communication capabilities appropriate for an entire flight.

6. A method for providing a low cost-per-flight configurable space launch system of a plurality of space launch vehicles as recited in claim 1, wherein the plurality of liquid propellant tanks installing step includes the substep of choosing optimal low cost external tanks.

7. A method for providing a low cost-per-flight configurable space launch system of a plurality of space launch vehicles as recited in claim 1, wherein the plurality of space launch vehicles configuring step includes the substeps of:
    performing variations in at least the number of spaceplanes, the number and size and position of external tanks, and the number of in-flight staging points; and
    performing system level trades and analyses to guide decisions to reach an optimal low cost-per-flight space launch system.

8. A method for providing a low cost-per flight space launch vehicle, comprising:
    selecting a reusable spaceplane wherein the reusable spaceplane selecting step includes at least the substep of excluding any permanently installed or integral ascent propellant tanks within the reusable spaceplane;
    furnishing one or more of the reusable spaceplanes;
    installing a plurality of liquid propellant tanks detachably mounted external to the one or more reusable spaceplanes;
    supplying more than 90 percent of total ascent propellant volume in the detachably mounted external tanks; and
    including a means for achieving a plurality of in-flight staging points greater than the number of spaceplanes.

9. A method for providing a low cost-per-flight space launch vehicle as recited in claim 8, wherein the reusable spaceplane selecting step includes the substeps of:
    including a payload bay in the reusable spaceplane; and
    sizing the payload bay to the maximum cargo dimensions.

10. A method for providing a low cost-per-flight space launch vehicle as recited in claim 8, wherein the reusable spaceplane selecting step includes the substep of emplacing at least one removable main rocket engine for ascent acceleration in the reusable spaceplane.

11. A method for providing a low cost-per-flight space launch vehicle recited in claim 8, wherein the reusable spaceplane selecting step includes the substep of providing the reusable spaceplane with an aerodynamic shape and control surfaces appropriate for entry into Earth's atmosphere and landing intact.

12. A method for providing a low cost-per-flight space launch vehicle as recited in claim 8, wherein the reusable spaceplane selecting step includes the substeps of providing the reusable spaceplane with guidance, navigation, altitude and position control, maneuver, de-orbit, and communication capabilities appropriate for an entire flight.

13. A method for providing a low cost-per-flight space launch vehicle as recited in claim 8, wherein the plurality of liquid propellant tanks installing step includes the substeps of choosing optimal low cost external tanks.

14. A configurable space launch system, comprising:
    a plurality of differently configured space launch vehicles, wherein each vehicle incorporates one or more substantially identical reusable spaceplanes common to all vehicles;

a plurality of ascent propellant tanks mountable on at lest one attachment point of the one more spaceplanes or on at least one attachment point of an ascent propellant tank;

ascent liquid propellants, wherein greater than 90 percent of total ascent propellant volume is located in the plurality of ascent propellant tanks mountable on at least one attachment point of the one or more spaceplanes, or on at least one attachment point of an ascent propellant tank; and means for achieving for each of the plurality of space launch vehicles a plurality of in-flight staging points greater than the number of spaceplanes.

15. A configurable space launch system as recited in claim 14, wherein the plurality of differently configured space launch vehicles further differ in the combination of number of spaceplanes, the number and sizes and location of external tanks, and the number of in-flight staging points.

16. A configurable space launch system as recited in claim 14, wherein the common reusable spaceplane further comprises:

an aerodynamic shape and control surfaces appropriate for entry and flight and landing in the Earth's atmosphere;

one or more removable and relocatable main rocket engines for achieving lift-off and acceleration to orbital velocity;

a payload bay for cargo and crew and passengers and special equipment and atmospheric cruise propulsion and auxiliary ascent propellant tanks or any one or combination thereof, wherein the payload bay is sized for the largest anticipated item or items; and means for achieving guidance, navigation, altitude and position control, maneuver, de-orbit, and communications appropriate for an entire flight.

17. A configurable space launch system as recited in claim 14, wherein the plurality of ascent propellant tanks are of optimal low cost.

18. A configurable space launch vehicle, comprising:

one or more substantially identical reusable spaceplanes;

a plurality of ascent propellant tanks mountable on an external component of the one or more spaceplanes or on an external component of another ascent propellant tank;

ascent liquid propellants wherein greater than 90 percent of total ascent propellant volume is located in the tanks mountable on an external component of the one or more spaceplanes; and means for achieving a plurality of in-flight staging points greater than the number of spaceplanes.

19. A configurable space launch vehicle as recited in claim 18, wherein the reusable spaceplane includes an aerodynamic shape and control surfaces appropriate for entry and flight and landing in the Earth's atmosphere.

20. A configurable space launch vehicle as recited in claim 18, wherein the reusable spaceplane includes one or more removable and relocatable main rocket engines for achieving lift-off and acceleration to orbital velocity.

21. A configurable space launch vehicle as recited in claim 18, wherein the reusable spaceplane includes a payload bay for cargo and crew and passengers and special equipment and atmospheric cruise propulsion and auxiliary ascent propellant tanks or any one or combination thereof, wherein the payload bay is sized for the largest anticipated item or items.

22. A configurable space launch vehicle as recited in claim 18, wherein the reusable spaceplane includes means for achieving guidance, navigation, altitude and position control, maneuver, de-orbit, and communications appropriate for an entire flight.

23. A configurable space launch vehicle as recited in claim 18, wherein the plurality of ascent propellant tanks are of optimal low cost.

* * * * *